US012157851B2

(12) United States Patent
Ohtani et al.

(10) Patent No.: US 12,157,851 B2
(45) Date of Patent: Dec. 3, 2024

(54) ANTHRAQUINONE COMPOUND-CONTAINING LIQUID CRYSTAL COMPOSITION FOR CONTROLLING LIGHT, PHOTOCURED PRODUCT THEREOF, AND LIGHT-CONTROLLING ELEMENT

(71) Applicant: Nippon Kayaku Kabushiki Kaisha, Tokyo (JP)

(72) Inventors: Kohei Ohtani, Tokyo (JP); Saori Suzuki, Tokyo (JP); Kanae Ogawa, Tokyo (JP); Takashi Yoshimoto, Tokyo (JP); Yu Hattori, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/267,846

(22) PCT Filed: Dec. 16, 2021

(86) PCT No.: PCT/JP2021/046479
§ 371 (c)(1),
(2) Date: Jun. 16, 2023

(87) PCT Pub. No.: WO2022/138433
PCT Pub. Date: Jun. 30, 2022

(65) Prior Publication Data
US 2024/0052243 A1    Feb. 15, 2024

(30) Foreign Application Priority Data
Dec. 25, 2020 (JP) ................... 2020-217007

(51) Int. Cl.
*G02F 1/1333* (2006.01)
*C09K 19/32* (2006.01)
*C09K 19/60* (2006.01)
*G02F 1/1337* (2006.01)

(52) U.S. Cl.
CPC ............ *C09K 19/322* (2013.01); *C09K 19/60* (2013.01); *G02F 1/133788* (2013.01); *C09K 2019/325* (2013.01)

(58) Field of Classification Search
CPC .... C09K 19/32; C09K 19/322; C09K 19/325; C09K 19/60; C09K 19/603; G02F 1/1333; G02F 1/133788
See application file for complete search history.

(56) References Cited

U.S. PATENT DOCUMENTS

2024/0043749 A1   2/2024  Ohtani et al.
2024/0052243 A1*  2/2024  Ohtani .............. C09K 19/603

FOREIGN PATENT DOCUMENTS

| CN | 108663866 A | 10/2018 | |
| JP | 62-5941 A | 1/1987 | |
| JP | 63-90568 A | 4/1988 | |
| JP | 63-501512 A | 6/1988 | |
| JP | 4-264193 A | 9/1992 | |
| JP | 5-224191 A | 9/1993 | |
| JP | 2011190314 A | * 9/2011 | ............. C09K 19/60 |

OTHER PUBLICATIONS

Machine Translation of JP 62-005941 (Year: 2024).*
Machine Translation of JP 2011-190314 (Year: 2024).*
Machine translation of JP 5-224191 (Year: 2024).*
International Search Report and Written Opinion mailed Mar. 8, 2022 in corresponding PCT application No. PCT/JP2021/046479.
International Search Report and Written Opinion mailed Mar. 8, 2022 in co-pending PCT application No. PCT/JP2021/046495.
International Preliminary Report on Patentability issued Jul. 6, 2023 in corresponding PCT application No. PCT/JP2021/046479.
International Preliminary Report on Patentability issued Jul. 6, 2023 in co-pending PCT application No. PCT/JP2021/046495.
Office Action mailed Apr. 24, 2024 in co-pending U.S. Appl. No. 18/267,849.
Office Action mailed Jul. 31, 2024 in co-pending U.S. Appl. No. 18/267,849.

* cited by examiner

*Primary Examiner* — Geraldina Visconti
(74) *Attorney, Agent, or Firm* — Nields, Lemack & Frame, LLC

(57) ABSTRACT

The present invention pertains to: a liquid crystal composition for controlling light that contains, as a dichroic dye, an anthraquinone compound having a specific structure; and a light-controlling element that contains a cured product of said liquid crystal composition for controlling light and exhibits excellent contrast, light-blocking performance, lightfastness, and heat tolerance during current supply. More specifically, the present invention pertains to: a liquid crystal composition for controlling light that contains a compound represented by formula (A) (in the formula. R1 represents a C1-12 alkyl group or a C1-12 alkoxy group, and each R2 independently represents a C1-8 alkyl group), a liquid crystal material, a photocurable compound, and a photoinitiator; and a light-controlling element that is formed by sandwiching a photocured product of said composition between a pair of substrates.

(A)

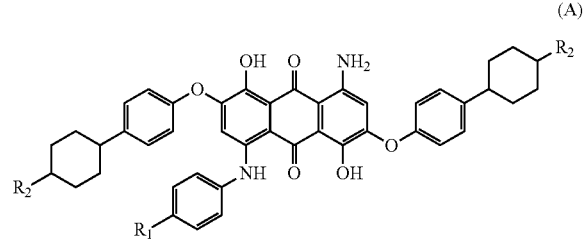

16 Claims, No Drawings

ANTHRAQUINONE COMPOUND-CONTAINING LIQUID CRYSTAL COMPOSITION FOR CONTROLLING LIGHT, PHOTOCURED PRODUCT THEREOF, AND LIGHT-CONTROLLING ELEMENT

TECHNICAL FIELD

The present invention relates to a liquid crystal composition for controlling light containing an anthraquinone compound, a photocured product of the liquid crystal composition for controlling light, and a light-controlling element using the photocured product.

BACKGROUND ART

When an electric field is not applied, incident light is scattered due to a large difference between the refractive index of the polymer and the refractive index of the liquid crystal, and the liquid crystal layer is in a fogging state. When an electric field is applied, the liquid crystal is aligned in the direction of the electric field, and the difference between the refractive index of the polymer and the refractive index of the liquid crystal decreases, so that the liquid crystal layer is in a transparent state (PATENT LITERATURE 1).

In vehicles such as trains and automobiles, windows, doors, partitions, and the like of buildings such as business buildings and hospitals, light-control films using such properties have been generally used instead of blinds for the purpose of protecting privacy and the like. Usually, such a light-control film can block a field of view by controlling transmission and scattering of light depending on whether or not a voltage is applied, but cannot block light itself, and therefore glare tends to increase due to light scattering. Therefore, for the purpose of reducing glare, improving contrast, and the like, attempts have been made to use dye as a material of the light-control panel. For example, in the case of using such a light-control panel for a window glass of an automobile, there is a strong demand for light-blocking performance in which there is no cloudiness at the time of transparency and visibility is good, and at the same time, a transmittance as low as about 10% is obtained at the time of light blocking, and lightfastness and heat tolerance during current supply in which the transmittance does not decrease even when light is irradiated at a high temperature for a long time or a voltage is applied for a long time due to the influence of long-term exposure due to outdoor use.

A dichroic dye is generally used as a dye used in the light-control film. As a light-controlling element using a liquid crystal composition containing a dichroic dye, a GH (guest-host) type which does not contain a polymer is known, and various dichroic dyes have been proposed (PATENT LITERATURES 2 and 3).

Such dichroic dyes are originally required to have lightfastness, heat tolerance, and the like as well as contrast when used as a display element, and efforts have been made to improve these characteristics. However, in light-controlling applications containing a polymer and a liquid crystal, there has not been found one that can satisfy light-blocking performance, contrast, lightfastness, and heat tolerance during current supply. For example, PATENT LITERATURE 4 discloses a dichroic dye suitable for light-controlling applications containing a polymer and a liquid crystal, but the dye of PATENT LITERATURE 4 is insufficient in terms of both contrast, lightfastness, and heat tolerance during current supply. In addition, the light-controlling material of PATENT LITERATURE 5 has a high transmittance of about 25% at the time of light blocking, and light-blocking performance is insufficient.

CITATION LIST

Patent Literature

PATENT LITERATURE 1: JPS63-501512A
PATENT LITERATURE 2: JPS62-5941A
PATENT LITERATURE 3: JPS63-90568A
PATENT LITERATURE 4: JPH05-224191A
PATENT LITERATURE 5. JPH04-264193A

SUMMARY OF INVENTION

Technical Problem

An object of the present invention is to provide a liquid crystal composition for controlling light containing an anthraquinone compound having a specific structure as a dichroic dye, and a light-controlling element that contains a cured product of the liquid crystal composition for controlling light and exhibits excellent contrast, light-blocking performance, lightfastness, and heat tolerance during current supply.

Solution to Problem

As a result of intensive studies, the present inventors have found that the above problems can be solved by using an anthraquinone compound having a specific structure, and have completed the present invention.

That is, aspects of the present invention are as follows.
(1). A liquid crystal composition for controlling light, comprising:
a compound represented by the formula (A)

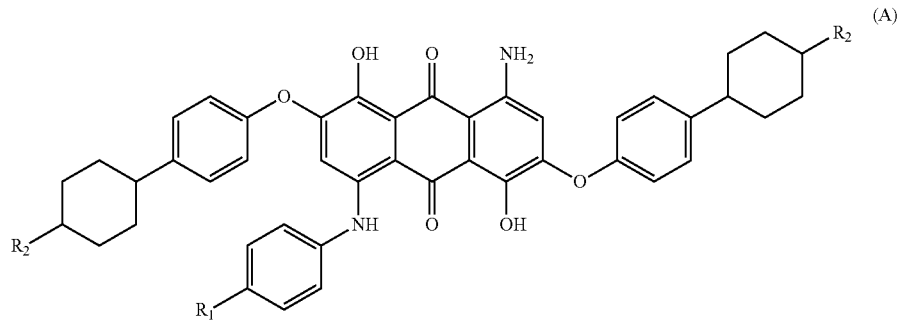

(in the formula, $R_1$ represents an alkyl group having 1 to 12 carbon atoms or an alkoxy group having 1 to 12 carbon atoms, and each $R_2$ independently represents an alkyl group having 1 to 8 carbon atoms);
a liquid crystal material;
a photocurable compound, and
a photopolymerization initiator.

(2). The liquid crystal composition for controlling light according to (1), wherein $R_1$ in the formula (A) is an alkyl group having 1 to 4 carbon atoms or an alkoxy group having 1 to 4 carbon atoms.

(3). The liquid crystal composition for controlling light according to (1) or (2), comprising one or more dichroic dyes other than the compound represented by the formula (A).

(4). A photocured product of the liquid crystal composition for controlling light according to any one of (1) to (3).

(5). A light-controlling element comprising a photocured product of the liquid crystal composition according to (4) sandwiched between a pair of oppositely disposed substrates, at least one of which is a transparent substrate having a transparent electrode.

(6). The light-controlling element according to (5), wherein both of the pair of substrates are transparent substrates having a transparent electrode.

Advantageous Effects of Invention

By using the liquid crystal composition for controlling light of the present invention, a light-controlling element excellent in lightfastness, heat tolerance during current supply, contrast, and light-blocking performance can be obtained.

DESCRIPTION OF EMBODIMENTS

Hereinafter, the present invention is described in detail.

The liquid crystal composition for controlling light of the present invention (hereinafter, it is also simply referred to as "composition of the present invention") contains a compound represented by the following formula (A), a liquid crystal material, a photocurable compound, and a photopolymerization initiator.

The compound having a specific structure having an anthraquinone backbone represented by the formula (A) as a mother backbone, which is contained in the composition of the present invention, functions as a dichroic dye in the composition of the present invention.

In the formula (A), $R_1$ represents an alkyl group having 1 to 12 carbon atoms or an alkoxy group having 1 to 12 carbon atoms, and each $R_2$ independently represents an alkyl group having 1 to 8 carbon atoms.

The alkyl group having 1 to 12 carbon atoms represented by $R_1$ in the formula (A) may be linear, branched, or cyclic. Specific examples thereof include a methyl group, an ethyl group, an n-propyl group, an iso-propyl group, an n-butyl group, an iso-butyl group, a sec-butyl group, a t-butyl group, an n-pentyl group, an iso-pentyl group, a neo-pentyl group, a t-pentyl group, a hexyl group, a heptyl group, an octyl group, a nonyl group, a decyl group, an undecyl group, a dodecyl group, a cyclopentyl group, a cyclohexyl group, a 2-ethylhexyl group, a 2-propylhexyl group, a 2-butylhexyl group, a 2-pentylhexyl group, and a 2-pentylheptyl group. A linear or branched alkyl group having 1 to 9 carbon atoms is preferable, and a linear or branched alkyl group having 1 to 4 carbon atoms is more preferable.

The alkoxy group having 1 to 12 carbon atoms represented by $R_1$ in the formula (A) may be linear or branched. Specific examples thereof include a methoxy group, an ethoxy group, an n-propoxy group, an iso-propoxy group, an n-butoxy group, an iso-butoxy group, a sec-butoxy group, a t-butoxy group, an n-pentyloxy group, an iso-pentyloxy group, a neo-pentyloxy group, a t-pentyloxy group, a hexyloxy group, a heptyloxy group, an octyloxy group, a nonyloxy group, a decyloxy group, an undecyloxy group, and a dodecyloxy group. A linear or branched alkoxy group having 1 to 10 carbon atoms is preferable, and a linear or branched alkoxy group having 1 to 4 carbon atoms is more preferable.

The alkyl group having 1 to 8 carbon atoms represented by $R_2$ in the formula (A) may be linear or branched. Specific examples thereof include the same linear or branched alkyl group having 1 to 8 carbon atoms as described in the section of the alkyl group having 1 to 12 carbon atoms represented by $R_1$ in the formula (A). A linear or branched alkyl group having 1 to 7 carbon atoms is preferable, and a linear alkyl group having 3 to 7 carbon atoms is more preferable.

Preferable specific examples of the compound represented by the formula (A) include the following compounds.

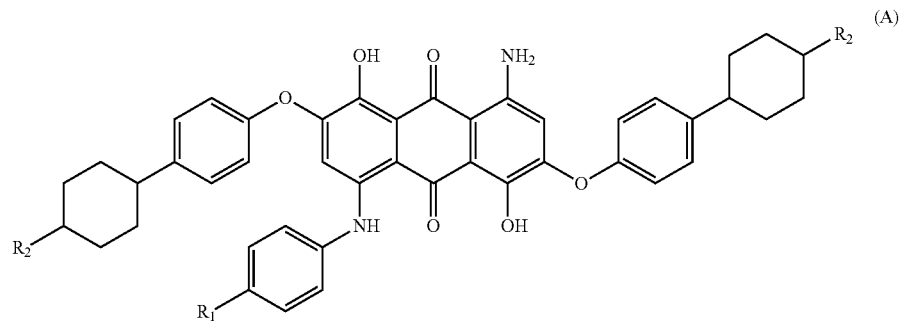

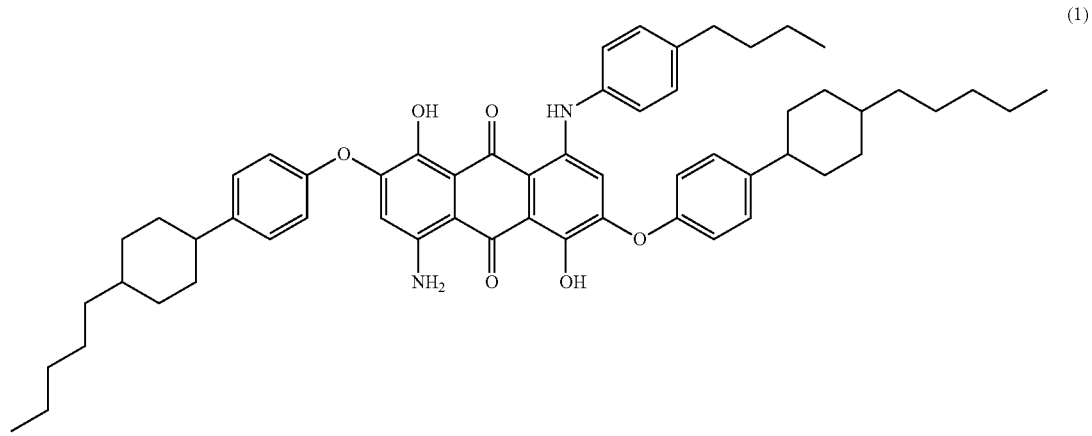
(1)
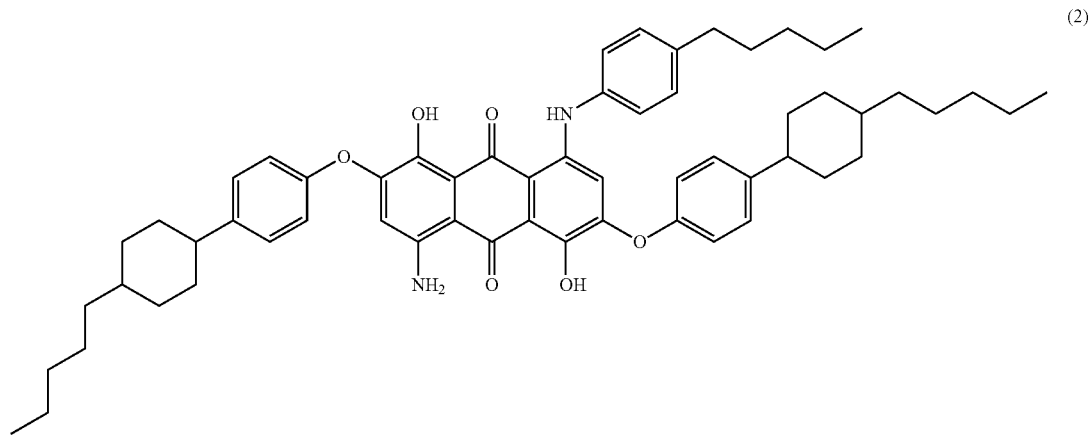
(2)
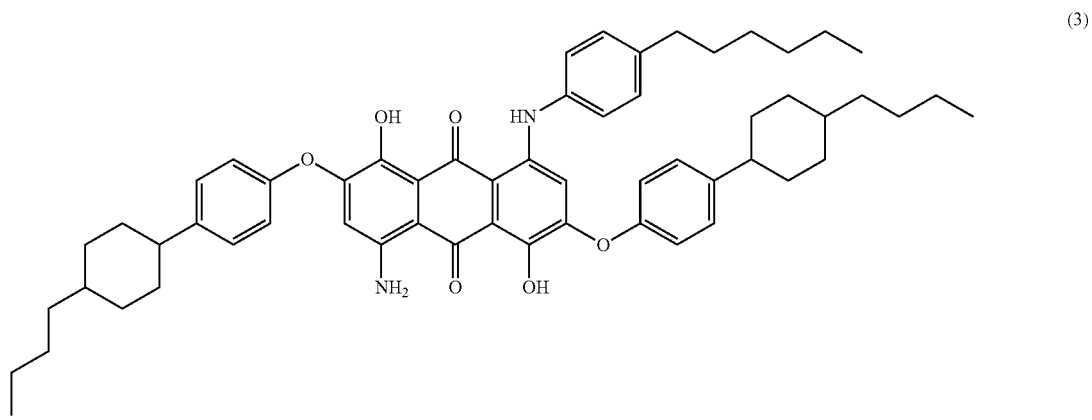
(3)
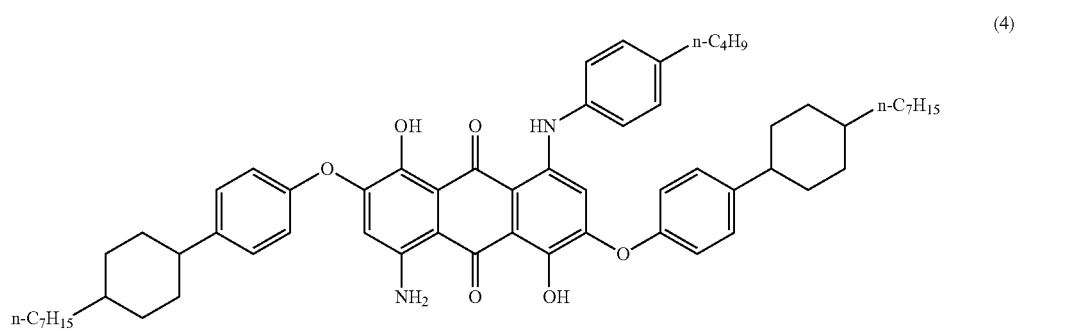
(4)

-continued
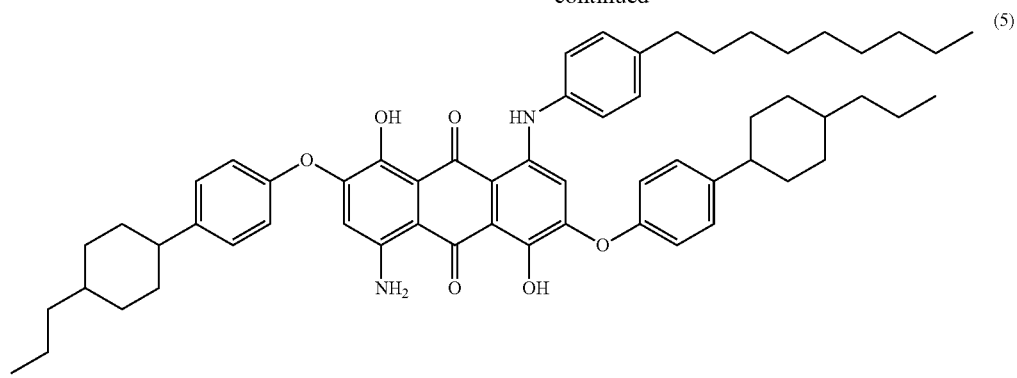
(5)
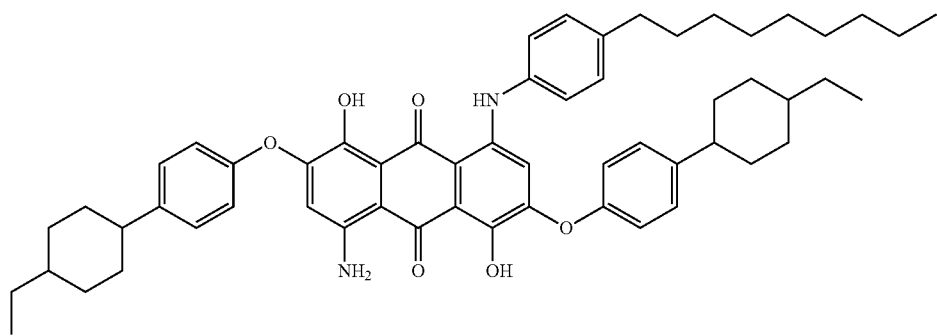
(6)
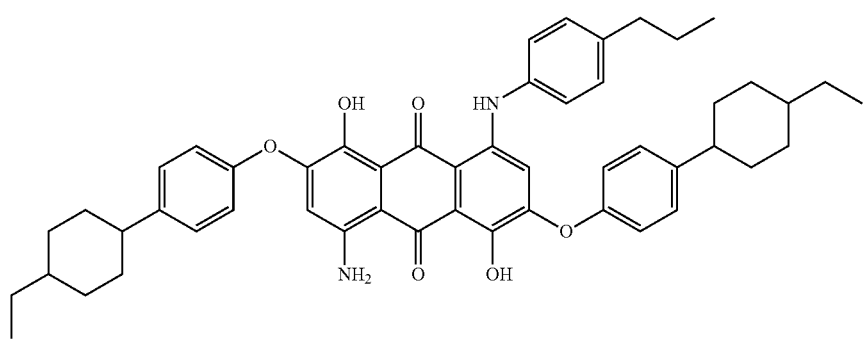
(7)
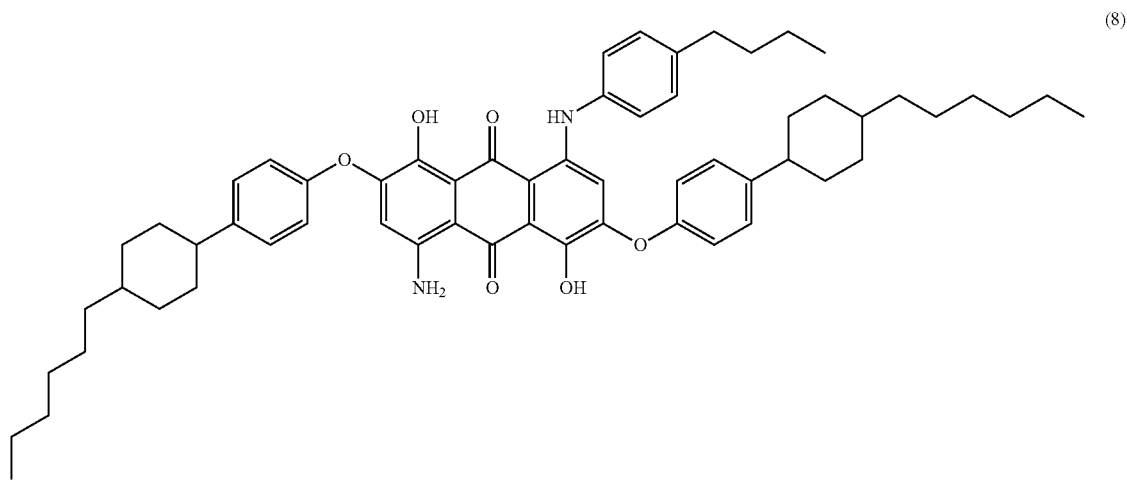
(8)

-continued
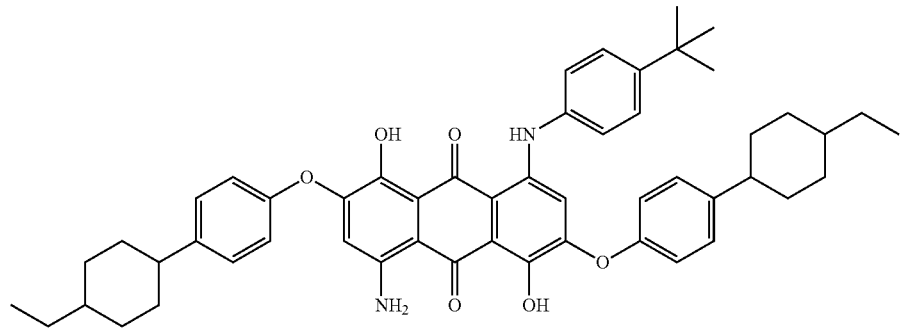
(9)
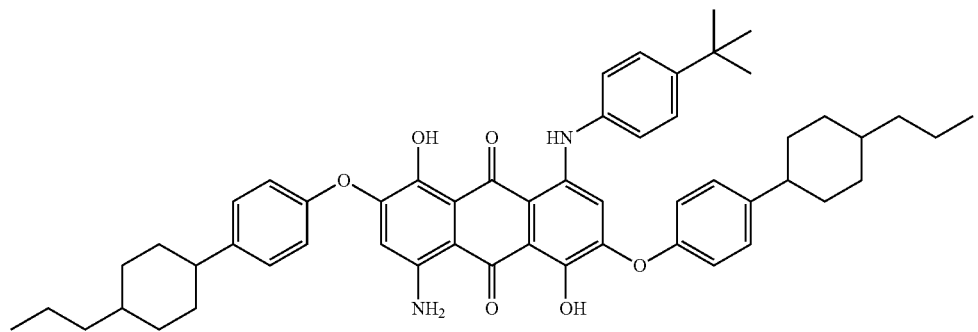
(10)
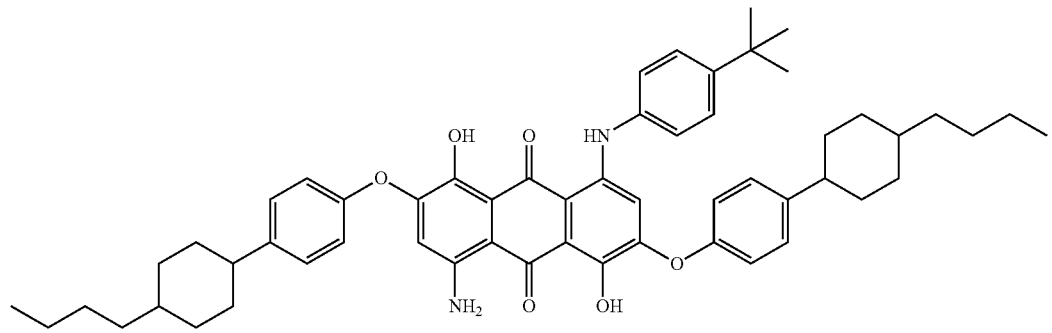
(11)
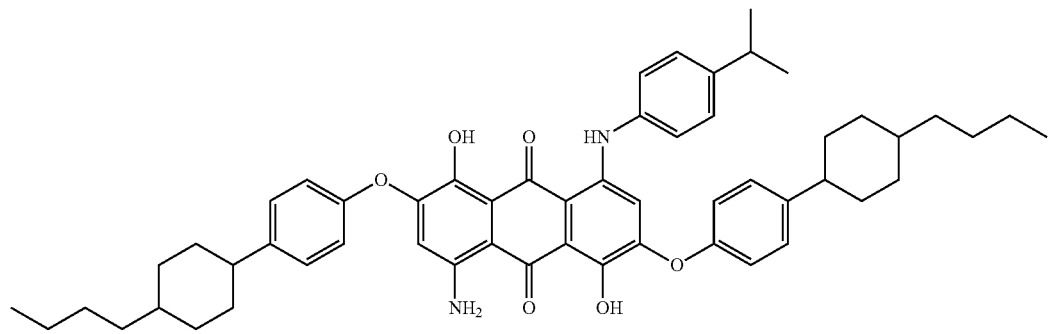
(12)

(13)
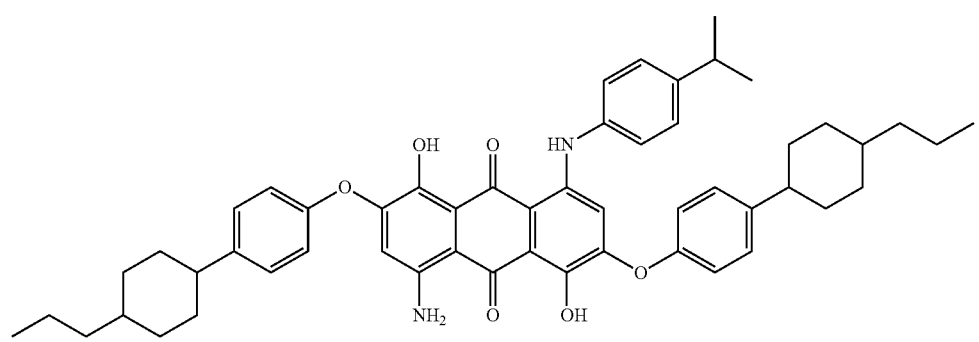
(14)
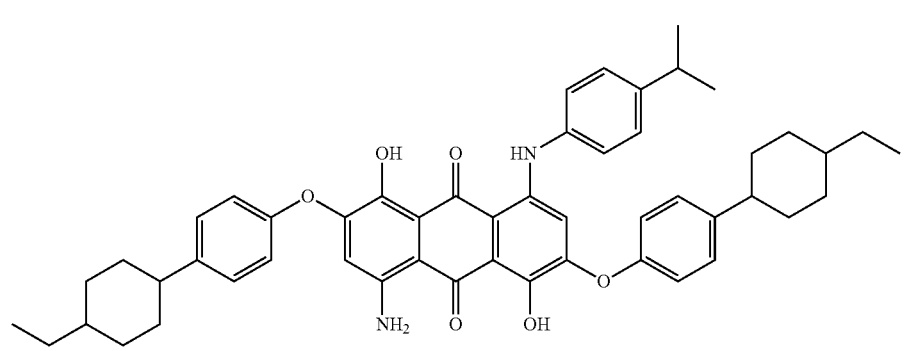
(15)
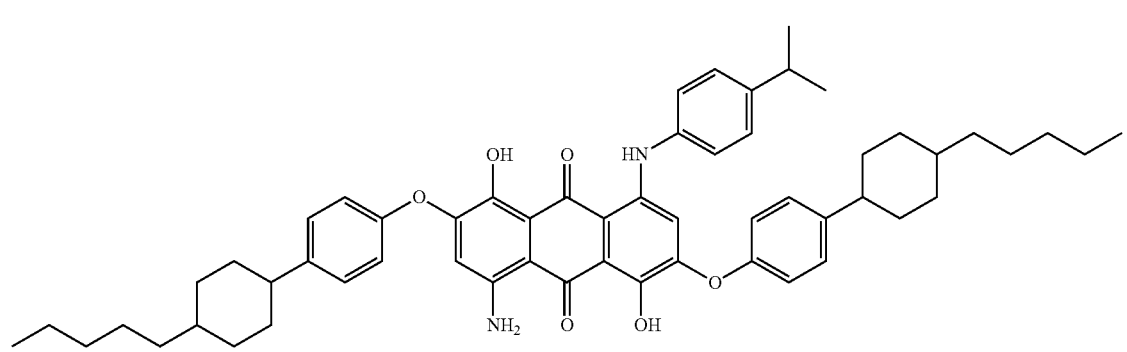
(16)
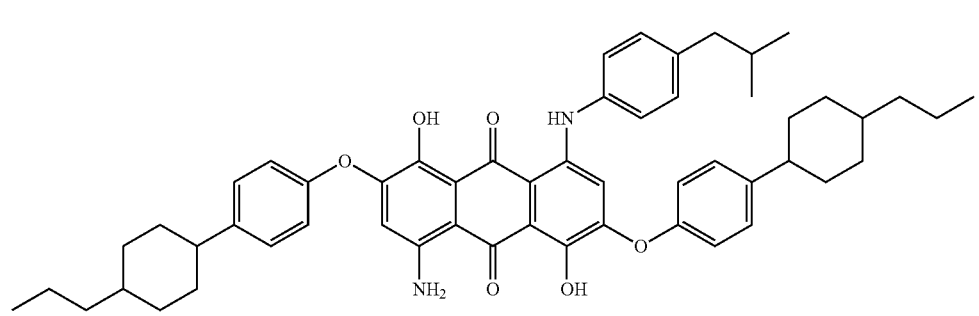
(17)
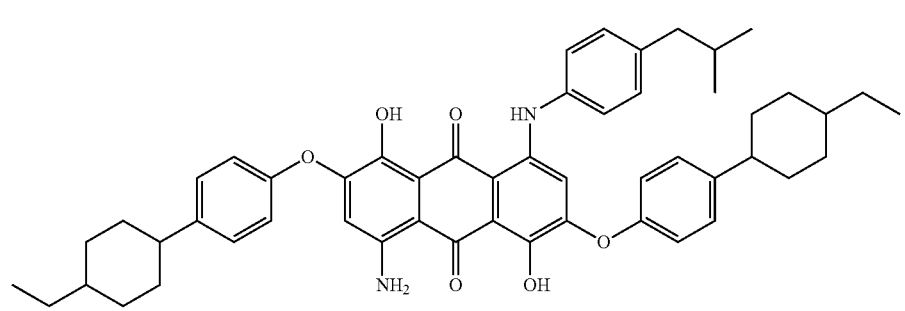

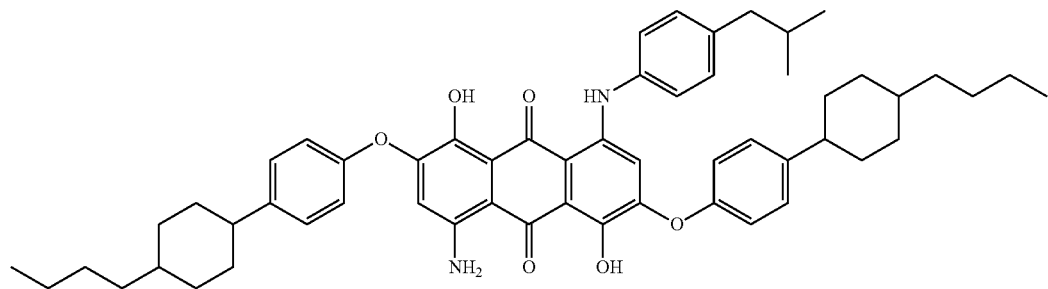
(18)
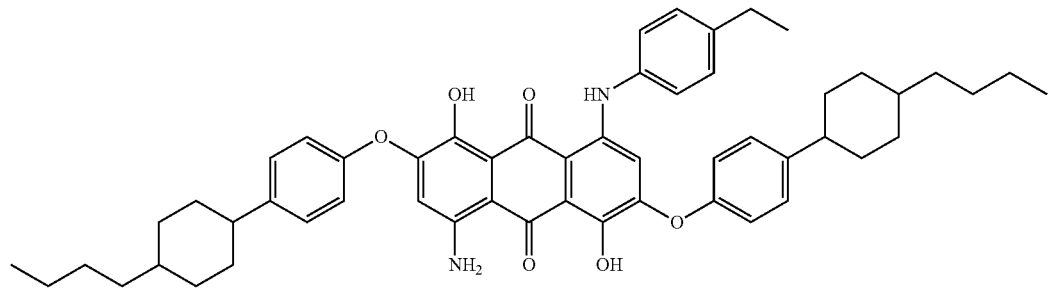
(19)
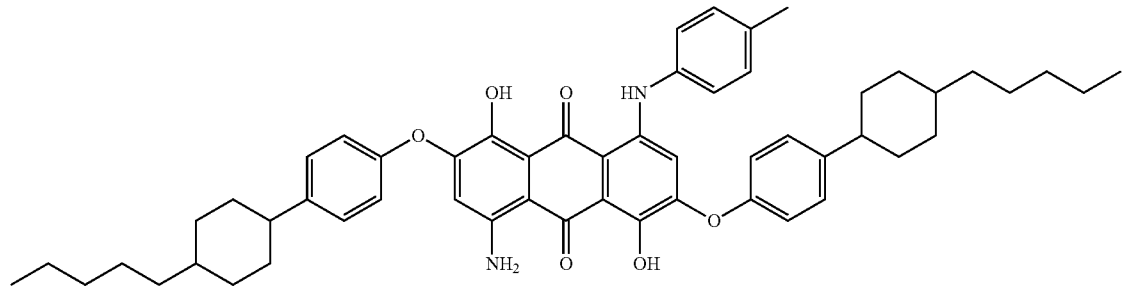
(20)
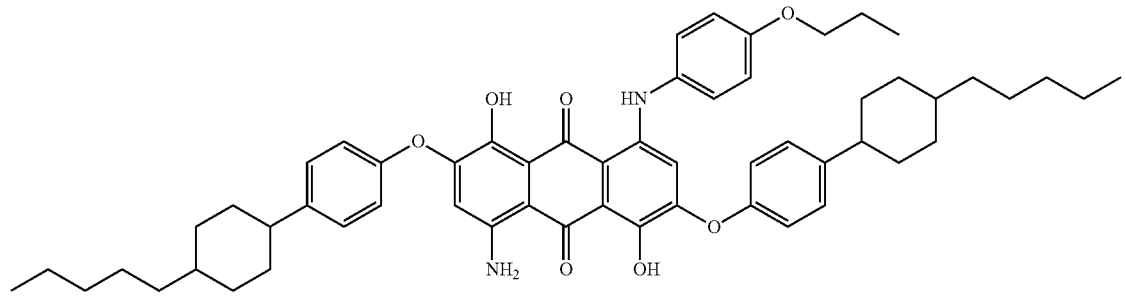
(21)
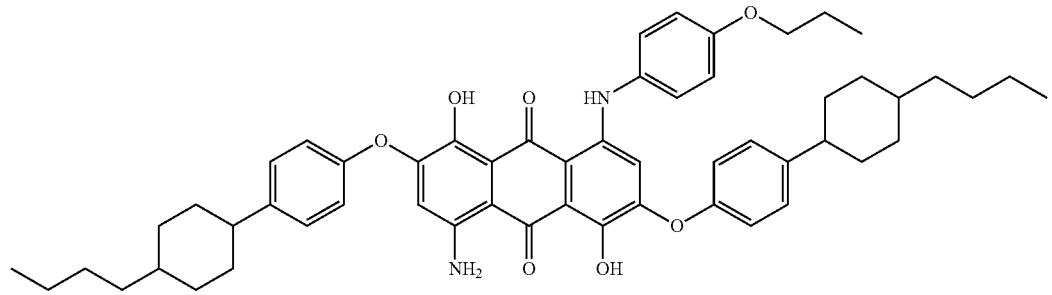
(22)

-continued
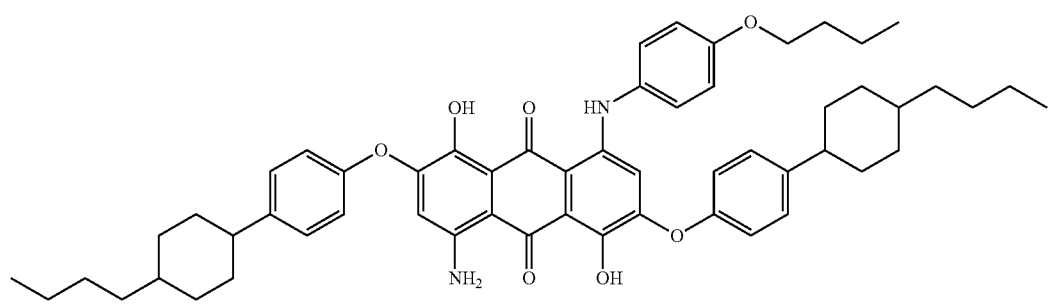
(23)
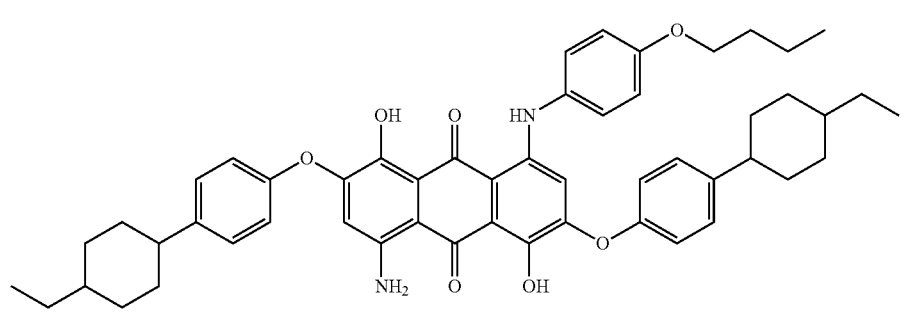
(24)
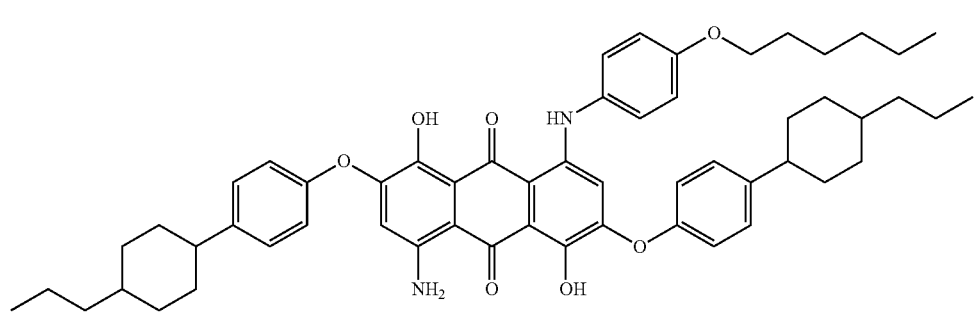
(25)
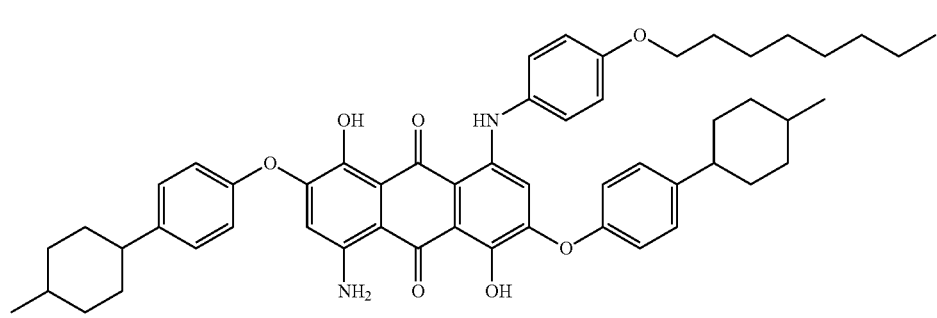
(26)
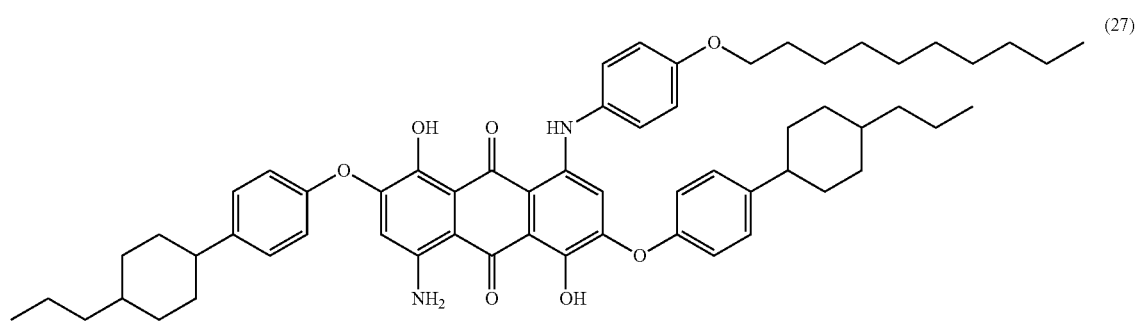
(27)

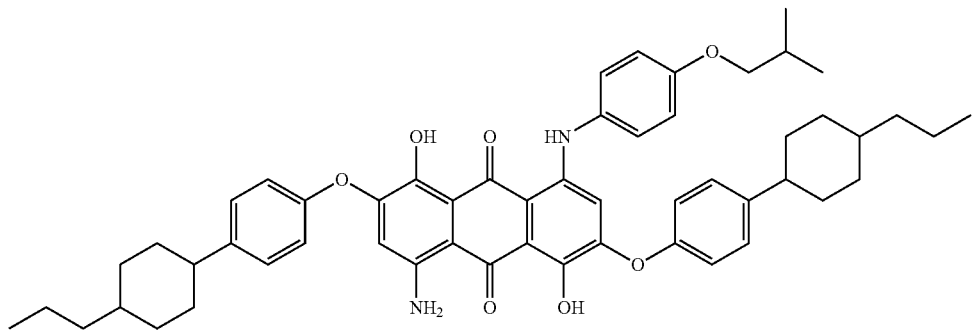
(28)

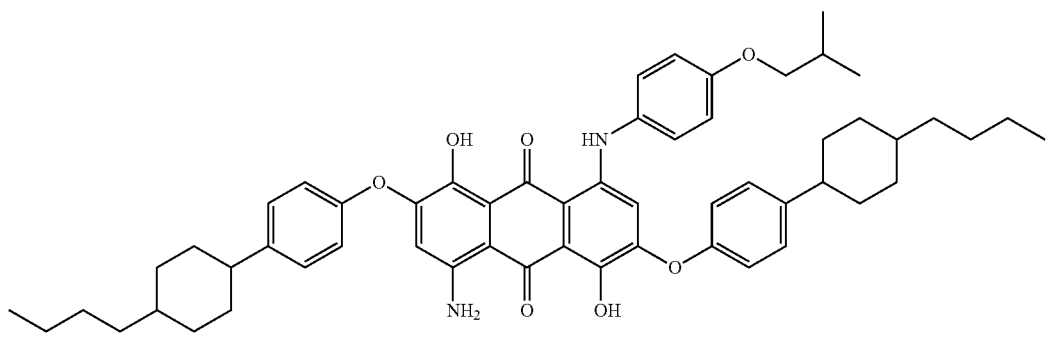
(29)

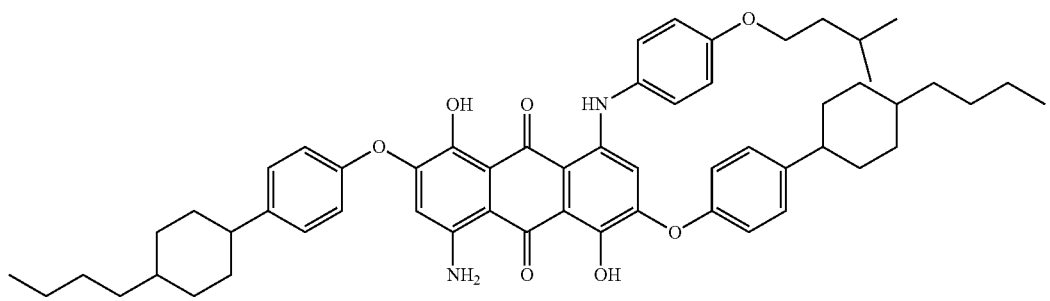
(30)

The compound represented by the formula (A) can be synthesized by a conventionally known method described in, for example, JPS63-90568A.

When the solubility of the compound represented by the formula (A) in the composition of the present invention is defined as the concentration of the compound represented by the formula (A) with respect to the constituents excluding the compound represented by the formula (A) in a composition obtained by stirring all the constituents of the composition of the present invention at 40 to 50° C. for 1 hour and then performing filtration, the concentration is preferably 0.5 to 10 mass %, and more preferably 1.0 to 6.0 mass %. When the solubility of the compound represented by the formula (A) in the composition of the present invention is within the above range, a sufficient dye addition effect can be obtained, and inhibition of polymerization of the photocurable compound when the composition of the present invention is irradiated with light to form a cured product can be prevented.

The liquid crystal material contained in the composition of the present invention is not particularly limited as long as it is a material having liquid crystallinity (compound having liquid crystallinity) such as nematic liquid crystal, cholesteric liquid crystal, or smectic liquid crystal, but among them, nematic liquid crystal is preferable. Examples of the compound having liquid crystallinity include the liquid crystal compounds described in pages 154 to 192 and pages 715 to 722 of "Liquid Crystal Device Handbook" (Edited by the 142nd Committee of Japan Society for the Promotion of Science, edited by THE NIKKAN KOGYO SHIMBUN, LTD., 1989).

The photocurable compound contained in the composition of the present invention is not particularly limited as long as it is a compound having a functional group polymerizable by the action of a photopolymerization initiator described later when irradiated with light. As the photocurable compound, both of a monofunctional monomer having one polymerizable functional group and a bifunctional monomer having two polymerizable functional groups are preferably used in combination.

The monofunctional monomer as the photocurable compound used in the composition of the present invention has compatibility with a liquid crystal in the composition before light irradiation, and forms a cured product phase by phase separation from the liquid crystal when polymerized by light irradiation, and plays a role of alleviating interface interaction with the liquid crystal phase. Therefore, when the polarity of the monofunctional monomer is excessively high, the interface interaction with the liquid crystal phase becomes too strong to inhibit the movement of the liquid crystal, and a high driving voltage is required. Therefore, the polarity of the monofunctional monomer is preferably low.

The bifunctional monomer as the photocurable compound used in the composition of the present invention forms a cured product phase by phase separation from the liquid crystal when polymerized by light irradiation, and plays a role of stabilizing a separated state from the liquid crystal phase. Therefore, when the polarity of the bifunctional monomer is excessively high, the interface interaction with the liquid crystal phase becomes too strong to inhibit the movement of the liquid crystal, and a high driving voltage is required. Therefore, it is preferable that the polarity of the bifunctional monomer is also low.

Examples of the photocurable compound include a compound having a (meth)acrylate group, a compound having a vinyl group, and a compound having an allyl group. A compound having a (meth)acrylate group is preferable. That is, it is more preferable to use both the mono(meth)acrylate compound having one (meth)acrylate group in one molecule and the di(meth)acrylate compound having two (meth)acrylate groups in one molecule in combination.

In the present specification, the term "(meth)acrylate" means "methacrylate and/or acrylate".

As the mono(meth)acrylate compound, mono(meth)acrylate having a linear, cyclic, or branched alkyl group having 5 to 13 carbon atoms is preferable. Specific examples thereof include linear alkyl mono(meth)acrylates such as pentyl (meth)acrylate, hexyl(meth)acrylate, heptyl(meth)acrylate, octyl(meth)acrylate, nonyl(meth)acrylate, decyl(meth)acrylate, undecyl(meth)acrylate, dodecyl(meth)acrylate, and tridecyl(meth)acrylate; cyclic alkyl mono(meth)acrylates such as isobornyl(meth)acrylate; and branched alkyl mono(meth) acrylates such as 2-methylhexyl(meth)acrylate, 2-ethylhexyl (meth)acrylate, 2-propylhexyl(meth)acrylate, 2-methylheptyl(meth)acrylate, 2-ethylheptyl(meth)acrylate, and 2-propylheptyl(meth)acrylate.

As the di(meth)acrylate compound, for example, 1,4-butanediol di(meth)acrylate, 1,5-pentanediol di(meth)acrylate, 1,6-hexanediol di(meth)acrylate, 1,7-heptanediol di(meth)acrylate, 1,8-octanediol di(meth)acrylate, 1,9-nonanediol di(meth)acrylate, 1,10-decanediol di(meth)acrylate, 1,11-undecanediol di(meth)acrylate, 1,12-dodecanediol di(meth)acrylate, and 1,13-tridecanediol di(meth)acrylate, and trialkylene glycol di(meth)acrylate such as triethylene glycol di(meth)acrylate are suitably used.

When the monofunctional monomer and the bifunctional monomer are used in combination, the mass ratio of the monofunctional monomer:the bifunctional monomer is preferably 1:9 to 9:1, and more preferably 5:5 to 9:1. When the amount of the monofunctional monomer to be used is in the above-mentioned range, the compatibility with the liquid crystal does not become too high, so that it is possible to prevent separation of the polymer (polymer phase) formed by light irradiation from the liquid crystal phase moderately and gelation of only the monomer, and in addition, it is easy to form a separated phase between the polymer phase and the liquid crystal phase.

The compatibility between the photocurable compound and the liquid crystal material contained in the composition of the present invention can be evaluated by once compatibilizing the photocurable compound with the liquid crystal material, and then visually observing phase separation that occurs with a decrease in temperature with a polarizing microscope, or by the phase separation temperature obtained by measurement such as DSC. The phase separation temperature between the photocurable compound and the liquid crystal material is preferably in the range of 0 to 50° C., and more preferably in the range of 10 to 40° C. When the phase separation temperature is in the above range, the photocurable compound in the composition has good compatibility with the liquid crystal material, and phase separation does not occur after polymerization of the photocurable compound proceeds by light irradiation, so that the liquid crystal phase formed as a result does not become too small, so that the driving voltage can be reduced, and in addition, it becomes easy to maintain the compatible state of the components until light irradiation.

The photopolymerization initiator contained in the composition of the present invention is not particularly limited as long as it is a compound capable of polymerizing a photocurable compound by light irradiation. It is preferable that the compound remains in the cured product after light irradiation and does not cause deterioration of the dichroic dye or the like.

As the photopolymerization initiator, for example, alkylphenone-based photopolymerization initiators such as Darocure 1173, Irgacure 651, and Irgacure 184, and phosphine oxide-based photopolymerization initiators such as Irgacure TPO are preferably used.

The content of the compound (dichroic dye) represented by the formula (A) in the composition of the present invention is preferably 0.5 to 5 parts by mass with respect to 100 parts by mass of the liquid crystal material.

When a dichroic dye (described later) other than the compound represented by the formula (A) is used in combination with the composition of the present invention, the total content of all dichroic dyes is preferably in the above range (0.5 to 5% by mass).

The blending ratio of the photocurable compound to the total of the compound represented by the formula (A) and the liquid crystal material in the composition of the present invention is preferably 90:10 to 50:50, more preferably 80:20 to 50:50, and still more preferably 65:35 to 50:50 in mass ratio. By setting the blending ratio of the photocurable compound within the above range, it is possible to prevent separation of the liquid crystal material and the photocurable compound before curing by light irradiation and deterioration of the light blocking property of the cured product.

When a dichroic dye (described later) other than the compound represented by the formula (A) is used in combination with the composition of the present invention, the blending ratio of the photocurable compound and the total of all the dichroic dyes and liquid crystal materials is preferably in the above range (90:10 to 50:50 in mass ratio), and the more preferable range and the further preferable range are the same as the above.

The content of the photopolymerization initiator in the composition of the present invention is preferably 0.1 to 5 parts by mass with respect to 100 parts by mass of the photocurable compound.

By using a dichroic dye other than the compound represented by the formula (A) in combination with the composition of the present invention, the contrast of the light-controlling element at the time of light blocking can be improved.

The dichroic dye that can be used in combination is not particularly limited, and may be selected from, for example, an azo dye, an anthraquinone dye, a perylene dye, a quinophthalone dye, a merocyanine dye, an azomethine dye, a phthaloperylene dye, an indigo dye, an azulene dye, a dioxazine dye, a polythiophene dye, and the like. Specific examples thereof include those described in "Dichroic dyes for Liquid Crystal Display" (A. V. Ivashchenko, CRC, 194).

Among them, an azo dye, an anthraquinone dye, a perylene dye, or a quinophthalone dye is preferably used in combination, and an azo dye and an anthraquinone dye are more preferably used in combination.

When a dichroic dye other than the compound represented by the formula (A) is used in combination, the content of the compound represented by the formula (A) in all the dichroic dyes is not particularly limited as long as the effect of the present invention is not impaired. The content thereof is preferably 1 to 80 mass %, more preferably 10 to 70 mass %, and still more preferably 30 to 60 mass %.

In addition to the compound (dichroic dye) represented by the formula (A), the liquid crystal material, the photocurable compound, and the photopolymerization initiator, for example, a light stabilizer such as a benzotriazole-based light stabilizer, a benzophenone-based light stabilizer, or a hindered amine-based light stabilizer, an antioxidant such as a phosphite-based light stabilizer or a hindered phenol-based light stabilizer, a thermal polymerization inhibitor, a thiol compound, a photosensitizer, a photosensitizer, a chain transfer inhibitor, a polymerization inhibitor, an adhesiveness imparting agent, an antifoaming agent, a crosslinking agent, a surfactant, a thermosetting accelerator, a thermoplastic resin, a thermosetting resin, a thickener such as urethane diacrylate, or the like may be used in combination with the composition of the present invention.

In addition, in order to control the cell gap as the light-controlling element, a spherical or cylindrical spacer such as silica, glass, plastic, or ceramic may be added. The cell gap at this time can be set in a range of 2 to 100 μm.

The composition of the present invention is obtained by mixing and stirring the compound represented by the formula (A), which is an essential component, the liquid crystal material, the photocurable compound, and the photopolymerization initiator, and optional components added as necessary. Mixing and stirring may be performed by simply placing all the constituents in a container and manually stirring them, but it is effective to perform stirring using a device such as a magnetic stirrer. In addition, in order to efficiently produce a uniform composition, it is preferable to first prepare a uniform mixture of a photocurable compound, a photopolymerization initiator, and a liquid crystal material, then add the compound represented by formula (A) and an optional component, and stir and mix them. During stirring and mixing, heating may be performed as necessary. Stirring and mixing under a light source that emits an absorption wavelength of the photopolymerization initiator are preferably performed in as short a time as possible. After mixing the components, filtration may be further performed using a mesh, a membrane filter, or the like.

By irradiating the composition of the present invention with light, a cured product of a liquid crystal composition for controlling light in which a photocurable compound component is cured (polymerized) is obtained. The "cured product" in the present invention means a state in which the functional group of the photocurable compound is polymerized or copolymerized by light irradiation, and does not necessarily mean a cured product in which the compound represented by the formula (A), the liquid crystal material, or the like has contributed to the curing reaction.

The light source at the time of light irradiation is not particularly limited as long as the light source can irradiate light having a wavelength absorbed by the photopolymerization initiator. Preferable examples of the ray source include a high-pressure mercury lamp, a metal halide lamp, a xenon lamp, and a halogen lamp capable of irradiating ultraviolet rays.

The temperature at the time of light irradiation is preferably a temperature at which the composition can be maintained in a uniformly compatible state, that is, a temperature higher than the phase separation temperature, and more preferably in a temperature range of 1 to 5° C. higher than the phase separation temperature. When the temperature at the time of light irradiation is higher than the phase separation temperature, the photocurable compound and the liquid crystal material are prevented from being separated before light irradiation, and a more uniform cured product can be obtained. On the other hand, when the temperature at the time of light irradiation is not significantly higher than the phase separation temperature, it can be prevented that the size of the domain formed by the liquid crystal material becomes excessively small when the polymer of the photocurable compound obtained by photocuring and the liquid crystal material are separated.

The light-controlling element of the present invention includes a layer of a photocured product of the liquid crystal composition for controlling light sandwiched between a pair of oppositely disposed substrates, at least one of which is a transparent substrate having a transparent electrode. Here, examples of the substrate include a colorless transparent, colored transparent, or opaque substrate such as an inorganic transparent material such as glass or quartz, a metal, a metal oxide, a semiconductor, a ceramic, a plastic plate, or a plastic film. The electrode is formed on the substrate by, for example, forming a thin film of a metal oxide, a metal, a semiconductor, an organic conductive material, or the like on the entire surface or a part of the substrate by a known coating method, a printing method, a vapor deposition method such as sputtering, or the like. In particular, in order to obtain a light-controlling element having a large area, it is desirable to use an electrode substrate in which an indium tin oxide, ITO (indium oxide, tin oxide) electrode is formed on a transparent polymer film such as PET using a vapor deposition method such as sputtering, a printing method, or the like from the viewpoint of productivity and processability. Wiring may be provided on the substrate for connecting between the electrodes or between the electrodes and the outside. For example, the electrode substrate may be a segment driving electrode substrate, a matrix driving electrode substrate, an active matrix driving electrode substrate, or the like. Furthermore, the surface of the electrode provided on the substrate may be entirely or partially covered with a protective film or an alignment film made of an organic compound such as a polyimide, a polyamide, silicon, or a cyan compound, an inorganic compound such as $SiO_2$, $TiO_2$, or $ZrO_2$, or a mixture thereof.

By using the plastic film as a substrate, a flexible and lightweight light-controlling element can be obtained. Therefore, it is possible to use the light-controlling element by sandwiching the light-controlling element between a pair of planar or curved substrates of glass, hard plastic, or the like with an adhesive layer such as polyvinyl butyral, vinyl acetate, a double-sided tape, or an adhesive, or use the light-controlling element by attaching the light-controlling element to the surface of one planar or curved substrate of glass, hard plastic, or the like with a double-sided tape, an adhesive, or the like. Alternatively, it may be sandwiched between soft plastic substrates or attach to one side or both sides. In addition, a protective layer such as a hard coat, an ultraviolet rays cut layer, an infrared rays cut layer, or a half mirror may be provided on the substrate surface opposite to the electrode surface of the light-controlling element. Furthermore, a color filter may be laminated on the light-controlling element, or a polarizer filter may be attached to the light-controlling element. Alternatively, the light-controlling element may be laminated as a member of an electroluminescence display element, a light emitting diode display element, an electrochromic display element, or another liquid crystal display element.

A drive device for applying a voltage to the light-controlling element of the present invention is a device capable of applying a DC voltage of 2 to 100 V or an AC voltage of 10 to 1000 Hz, and may be a device that opens or short-circuits between electrodes when no voltage is applied. In addition, the drive device may include a voltage application circuit for segment driving, a voltage application circuit for matrix driving, a voltage application circuit for active matrix, and the like.

The light-controlling element of the present invention may be either a black color light-controlling element or a color light-controlling element depending on the application. The average transmittance at the time of light transmission in a specific wavelength region to the light-controlling element of the present invention is preferably 35% or more, and more preferably 40% or more. The average transmittance at the time of light blocking is preferably 25% or less, and more preferably 15% or less.

The black color light-controlling element has a neutral color, has little color leakage when no voltage is applied in a visible light region, is excellent in contrast, and is also excellent in lightfastness due to long-term outdoor exposure and heat tolerance during current supply. Therefore, such a black color light-controlling element is most suitable for in-vehicle use or building material use.

EXAMPLE

Hereinafter, the present invention is specifically described with reference to Examples. The terms "part" and "%" in the present description are on a mass standard unless otherwise specified. The maximum absorption wavelength in Examples is a value measured with a spectrophotometer "UV-3150 manufactured by Shimadzu Corporation".

Synthesis Example 1 (Synthesis of Compound Represented by Formula (1) as Specific Example)

2.7 parts of 1-(4-butylanilino)-5-amino-4,8-dihydroxy-3,7-dibromoanthraquinone were added to and dissolved in 35 parts of sulfolane, 0.90 parts of potassium carbonate and 4.2 parts of 4-(4-pentylcyclohexyl)phenol were added thereto, and the mixture was reacted at 130 to 140° C. for 5 hours. After the reaction, the reaction mixture was cooled, and methanol was added, and the precipitated crystal was filtered to obtain 1.2 parts of a compound represented by the formula (1). The maximum absorption wavelength of this compound in toluene was 621 nm.

Synthesis Example 2 (Synthesis of Compound Represented by Formula (4) as Specific Example)

3.0 parts of 1-(4-butylanilino)-5-amino-4,8-dihydroxy-3,7-dibromoanthraquinone were added to and dissolved in 35 parts of sulfolane, 0.90 parts of potassium carbonate and 4.7 parts of 4-(4-heptylcyclohexyl)phenol were added thereto, and the mixture was reacted at 130 to 140° C. for 5 hours. After the reaction, the reaction mixture was cooled, and methanol was added, and the precipitated crystal was filtered to obtain 1.0 parts of a compound represented by the formula (4). The maximum absorption wavelength of this compound in toluene was 622 nm.

Synthesis Example 3 (Synthesis of Compound Represented by Formula (10) as Specific Example)

3.0 parts of 1-(4-t-butylanilino)-5-amino-4,8-dihydroxy-3,7-dibromoanthraquinone were added to and dissolved in 35 parts of sulfolane, 0.90 parts of potassium carbonate and 4.7 parts of 4-(4-propylcyclohexyl)phenol were added thereto, and the mixture was reacted at 130 to 140° C. for 5 hours. After the reaction, the reaction mixture was cooled, and methanol was added, and the precipitated crystal was filtered to obtain 1.0 parts of a compound represented by the formula (10). The maximum absorption wavelength of this compound in toluene was 622 nm.

Comparative Synthesis Example 1 (Synthesis of Compound for Comparative Example)

A compound represented by Example 6 in JPS62-5941A (a compound represented by the following formula (X)) was obtained by a known synthesis method.

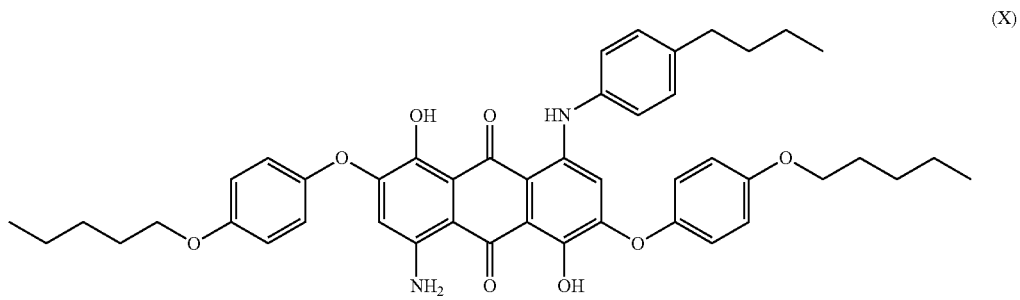 [SMILES: CCCCCOc1ccc(Oc2cc(N)c3c(c2O)C(=O)c2c(Nc4ccc(CCCC)cc4)cc(Oc4ccc(OCCCCC)cc4)c(O)c2C3=O)cc1]

(X)

Example 1 (Production of Liquid Crystal Composition for Controlling Light of Present Invention)

0.013 parts of the compound represented by the above formula (1) obtained in Synthesis example 1, 0.380 parts of isobornyl acrylate (monoacrylate manufactured by OSAKA ORGANIC CHEMICAL INDUSTRY LTD.), 0.020 parts of triethylene glycol dimethacrylate (manufactured by SHIN-NAKAMURA CHEMICAL Co., Ltd.), 0.283 parts of 1-cyano-4'-n-pentylbiphenyl, 0.139 parts of 1-cyano-4'-n-heptylbiphenyl, 0.089 parts of 1-cyano-4'-n-octyloxybiphenyl, 0.089 parts of 1-cyano-4''-n-pentylterphenyl, 0.004 parts of Irgacure TPO (manufactured by BASF SE), 0.004 parts of Irgacure 184 (manufactured by BASF SE), and 0.010 parts of a spacer agent (Micropearl (registered trademark) SP220 manufactured by SEKISUI CHEMICAL CO., LTD.) having a diameter of 20 μm were mixed at room temperature to prepare a liquid crystal composition for controlling light of the present invention.

Examples 2 and 3 and Comparative Example 1
(Production of Liquid Crystal Composition for Controlling Light of the Present Invention and Comparison)

A liquid crystal composition for controlling light of the present invention and a liquid crystal composition for controlling light of comparison were obtained according to Example 1 except that the compound represented by the formula (1) obtained in Synthesis example 1 was changed to the compound represented by the formula (4) obtained in Synthesis example 2, the compound represented by the formula (10) obtained in Synthesis example 3, and the compound represented by the formula (X) obtained in Comparative Synthesis example 1, respectively.

Examples 4 to 6 and Comparative Example 2
(Production of Light-Controlling Element of the Present Invention and Comparison)

Each of the liquid crystal compositions for controlling light obtained in Examples 1 to 3 and Comparative Example 1 was applied onto an ITO film of a 5 cm square PET film provided with an ITO film using an applicator, and a 5 cm square PET film provided with the same ITO film as described above was superimposed such that the composition layer on the ITO film faced the ITO film. Thereafter, the sample maintained at 23° C. by the thermoplate was set at a position where the light intensity at 365 nm of the LED lamp was 9 mW/cm², and light irradiation was performed for 1 minute to photocure the photocurable compound component, thereby obtaining each of the light-controlling element of the present invention and the comparative light-controlling element.

(Calculation of Transmittance Difference of Light-Controlling Element)

For the light-controlling elements obtained in Examples 4 to 6 and Comparative Example 2, the maximum absorption wavelength was measured, and the transmittance difference (transmittance change) was calculated from the measurement result of the transmittance (%) at the maximum absorption wavelength when a 100 V AC voltage (50 Hz sine wave) was applied and when no voltage was applied. The transmittance difference is a value calculated from a difference between the transmittance of the maximum absorption wavelength at the time of voltage application and the transmittance of the maximum absorption wavelength at the time of no voltage application, using each of light-controlling elements produced so that the transmittances of the maximum absorption wavelengths at the time of no voltage application (at the time of light blocking) become equal. As shown in Table 1, it was found that the light-controlling elements of Examples 4 to 6 had a significantly larger transmittance difference between the time of application and the time of non-application than the light-controlling element of Comparative Example 2.

TABLE 1

Transmittance difference measurement results

| Light-controlling element | Maximum absorption wavelength (nm) | Transmittance Voltage (0 V) | Transmittance Voltage (100 V) | Transmittance difference |
|---|---|---|---|---|
| Example 4 Compound of formula (1) | 639 | 12 | 61 | 49 |
| Example 5 Compound of formula (4) | 640 | 10 | 60 | 50 |
| Example 6 Compound of formula (10) | 639 | 11 | 60 | 49 |
| Comp. Example 2 Compound of formula (X) | 635 | 12 | 51 | 39 |

(Lightfastness Test of Light-Controlling Element)

A UV cut filter of 400 nm or less was attached to the light-controlling element obtained in each of Examples 4 to 6 and Comparative Example 2, and the absorbance at the maximum absorption wavelength when the light was irradiated for 24 hours with a metal halide lamp having an illuminance of 600 W/m² under the condition of 63° C. was measured, and the absorbance retention ((δA) %) was calculated. The absorbance retention ((δA) %) is defined as follows: when a value of absorbance at 0 hour is A (0) and a value of absorbance after 24 hours is A (24), $(\delta A)\% = (A(24)/A(0)) \times 100.$ The larger the value of δA, the better the lightfastness.

As shown in Table 2, it was confirmed that the light-controlling elements of Examples 4 to 6 had a larger absorbance retention than the light-controlling element of Comparative Example 2, and had excellent lightfastness.

TABLE 2

Lightfastness test results

| Light-controlling element | Maximum absorption wavelength (nm) | Absorbance retention (%) |
|---|---|---|
| Example 4 Compound of formula (1) | 639 | 78.3 |
| Example 5 Compound of formula (4) | 640 | 77.4 |
| Example 6 Compound of formula (10) | 639 | 75.2 |
| Comp. Example 2 Compound of formula (X) | 635 | 52.7 |

Example 7 (Production of Black Color Light-Controlling Element)

A black color light-controlling element was produced in the same manner as in Examples 4 to 6 by using the liquid crystal composition for controlling light of the present invention prepared in the same manner as in Example 1 except that the compound represented by the formula (1) was changed from 0.013 parts to 0.015 parts and 0.01 parts of LCD 212 (anthraquinone-based compound, manufactured by Nippon Kayaku Co., Ltd.) and 0.005 parts of LCD 307 (anthraquinone-based compound, manufactured by Nippon Kayaku Co., Ltd.) were added. The obtained black color light-controlling element had an average transmittance of 42% at voltage application of 400 to 700 nm and an average transmittance of 14% at no voltage application, showing a high transmittance difference.

The black color light-controlling element obtained in Example 7 had no change in transmittance even after a lapse of 500 hours in the xenon lightfastness test, and was also excellent in lightfastness when exposed to light for a long time. In addition, even when a 100 V AC voltage (50 Hz sine wave) was applied under the condition of 110° C., the transmittance did not change, and the heat tolerance during current supply was also excellent. From these results, it was shown that the black color light-controlling element of Example 7 was a black color liquid crystal light-controlling element having high contrast and high light-blocking performance and having lightfastness and heat tolerance during current supply.

By using the liquid crystal composition of the present invention, a light-controlling liquid crystal element having high contrast, high light-blocking performance, high lightfastness, and high heat tolerance during current supply can be obtained, and the light-controlling liquid crystal element can be suitably used for outdoor building material applications and in-vehicle applications requiring high durability.

The invention claimed is:

1. A liquid crystal composition for controlling light, comprising:
a compound represented by the following formula (A)

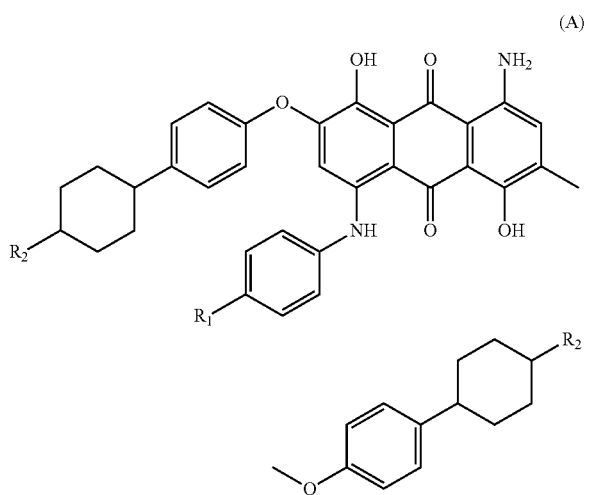

in the formula, $R_1$ represents an alkyl group having 1 to 4 carbon atoms or an alkoxy group having 1 to 12 carbon atoms, and each $R_2$ independently represents an alkyl group having 1 to 8 carbon atoms, the compound represented by the formula (A) being a dichroic dye;
a liquid crystal material;
a photocurable compound; and
a photopolymerization initiator.

2. The liquid crystal composition for controlling light according to claim 1, wherein $R_1$ in the formula (A) is an alkoxy group having 1 to 4 carbon atoms.

3. The liquid crystal composition for controlling light according to claim 1, further comprising one or more dichroic dyes other than the compound represented by the formula (A).

4. A photocured product of the liquid crystal composition for controlling light according to claim 1.

5. A light-controlling element comprising a photocured product of the liquid crystal composition for controlling light according to claim 4 sandwiched between a pair of oppositely disposed substrates, at least one of which is a transparent substrate having thereon a transparent electrode.

6. The light-controlling element according to claim 5, wherein both of the pair of substrates are transparent substrates having a transparent electrode.

7. The liquid crystal composition for controlling light according to claim 2, further comprising one or more dichroic dyes other than the compound represented by the formula (A).

8. A photocured product of the liquid crystal composition for controlling light according to claim 2.

9. A photocured product of the liquid crystal composition for controlling light according to claim 3.

10. A photocured product of the liquid crystal composition for controlling light according to claim 7.

11. A light-controlling element comprising a photocured product of the liquid crystal composition for controlling light according to claim 8 sandwiched between a pair of oppositely disposed substrates, at least one of which is a transparent substrate having thereon a transparent electrode.

12. A light-controlling element comprising a photocured product of the liquid crystal composition for controlling light according to claim 9 sandwiched between a pair of oppositely disposed substrates, at least one of which is a transparent substrate having thereon a transparent electrode.

13. A light-controlling element comprising a photocured product of the liquid crystal composition for controlling light according to claim 10 sandwiched between a pair of oppositely disposed substrates, at least one of which is a transparent substrate having thereon a transparent electrode.

14. The light-controlling element according to claim 11, wherein both of the pair of substrates are transparent substrates having thereon a transparent electrode.

15. The light-controlling element according to claim 12, wherein both of the pair of substrates are transparent substrates having thereon a transparent electrode.

16. The light-controlling element according to claim 13, wherein both of the pair of substrates are transparent substrates having thereon a transparent electrode.

* * * * *